United States Patent
Zinn et al.

(10) Patent No.: US 12,060,702 B2
(45) Date of Patent: Aug. 13, 2024

(54) ACCUMULATOR ASSEMBLY

(71) Applicant: Acorn Engineering Company, City of Industry, CA (US)

(72) Inventors: Thomas K. Zinn, Chino Hills, CA (US); Carlos J. Galeazzi, Rancho Cucamonga, CA (US)

(73) Assignee: Acorn Engineering Company, City of Industry, CA (US)

( * ) Notice: Subject to any disclaimer, the term of this patent is extended or adjusted under 35 U.S.C. 154(b) by 237 days.

(21) Appl. No.: 17/843,119

(22) Filed: Jun. 17, 2022

(65) Prior Publication Data

US 2022/0403633 A1    Dec. 22, 2022

Related U.S. Application Data

(60) Provisional application No. 63/212,382, filed on Jun. 18, 2021.

(51) Int. Cl.
| | |
|---|---|
| *E03C 1/122* | (2006.01) |
| *E03C 1/126* | (2006.01) |
| *E03C 1/14* | (2006.01) |
| *E03C 1/32* | (2006.01) |
| *G05D 9/02* | (2006.01) |

(52) U.S. Cl.
CPC ............ *E03C 1/1222* (2013.01); *E03C 1/126* (2013.01); *E03C 1/14* (2013.01); *E03C 1/32* (2013.01); *G05D 9/02* (2013.01)

(58) Field of Classification Search
CPC .......... E03C 1/1222; E03C 1/126; E03C 1/14; E03C 1/32; G05D 9/02

USPC .................................... 4/625, 626, 321, 482
See application file for complete search history.

(56) References Cited

U.S. PATENT DOCUMENTS

| | | | | |
|---|---|---|---|---|
| 4,161,792 | A * | 7/1979 | Dallen ...................... | F23G 5/50 4/321 |
| 6,837,258 | B1* | 1/2005 | Loreto .................... | E03F 1/006 137/907 |
| 2008/0035654 | A1* | 2/2008 | Hall ........................ | G01F 23/58 73/306 |

* cited by examiner

*Primary Examiner* — Tuan N Nguyen
(74) *Attorney, Agent, or Firm* — Honigman LLP; Eric J. Sosenko; Jonathan P. O'Brien

(57) ABSTRACT

An accumulator assembly having a wastewater retention tank defining an interior chamber. A fluid level sensor is coupled to the waste retention tank and configured to sense a level of liquid in the chamber. An extraction pipe extends into the chamber and is coupled to an extraction valve. Coupled to the fluid sensor is a controller that is also coupled to the fluid level sensor and to the extraction valve. The controller is configured to open the extraction valve upon receipt of a signal from the sensor. The accumulator assembly also includes an odor mitigation subassembly in fluid communication with the chamber. The odor mitigation subassembly further includes an air displacement port, an odor filter and an overflow prevention device, the overflow prevention device being in fluid communication with the chamber and located downstream of the air displacement port and upstream of the filter.

18 Claims, 11 Drawing Sheets

ACCUMULATOR ASSEMBLY

BACKGROUND

1. Field of the Invention

The present invention generally relates to accumulators for collecting wastewater. More particularly, the present invention an accumulator assembly for employment in a vacuum drainage system.

2. Description of Related Art

Medical examination rooms, as well as other types of rooms, are often provided with a table, cabinet or console having a wash basin and water supply to readily allow for the hands of the practitioner to be washed and for the disposal of non-biohazard liquid products. In newer construction of such facilities, the basin drains into an accumulator and a vacuum drainage system evacuates the wastewater from the accumulator on a periodic basis. This evacuation occurs when a sensor detects that a predetermined capacity of the accumulator's waste retention chamber has been reached.

To enable evacuation of the accumulator, an evacuation line, which is part of a vacuum wastewater collection system, is connected to the discharge v of valve associated with the accumulator. Typically, the evacuation line is located within the adjacent wall and extends downward, from the ceiling, emerging from the wall at a location behind the cabinet at a height corresponding to the discharge connection of the accumulator. When an extraction valve is opened, the vacuum pressure within the evacuation line causes the liquid in the accumulator to be "sucked" out of the accumulator and transported away by the vacuum wastewater collection system.

Prior to the evacuation of the wastewater from the accumulator, the wastewater can have an unpleasant odor. To mitigate the unpleasant odor in the examination room, the accumulator is vented, with the vent pipe extending from the waste retention chamber, out of the cabinet, into and up-through the adjacent wall. At the top of the wall the vent pipe may terminate in the ceiling space or be connected to a vent pipe exiting the building or area. Alternatively, the vent pipe may terminate within the cabinet and be equipped with a charcoal filter In addition, current systems include a sensing pipe, coupled to the waste retention chamber of the accumulator, that is connected to a sensor located at the accumulator or remotely, such as through the adjacent wall of the room. The sensing pipe is connected to a controller, which, based on the received signal, causes the extraction valve to open and the waste retention chamber to be emptied.

As seen from the above discussion, one disadvantage of know accumulator systems is that multiple pipe/lines must be provided in the adjacent wall of every basin/cabinet installation, and this adds significantly to the overall complexity and cost of construction.

SUMMARY OF THE INVENTION

In one aspect, the invention provides a wastewater collection device having an accumulator with an overflow arrester.

In another aspect the invention provides an accumulator assembly with a mitigation subassembly having overflow prevention device.

In another aspect the invention provides an accumulator assembly having a wastewater retention tank defining an interior chamber and including portions defining an inlet into the chamber. A fluid level sensor is coupled to the waste retention tank and configured to sense a level of liquid in the chamber. An extraction pipe extends into the chamber and is coupled to an extraction valve. Coupled to the fluid sensor is a controller that is also coupled to the fluid level sensor and to the extraction valve. The controller is configured to open the extraction valve upon receipt of a signal from the sensor. The accumulator assembly also includes an odor mitigation subassembly in fluid communication with the chamber. The odor mitigation subassembly further includes an air displacement port, an odor filter and an overflow prevention device, the overflow prevention device being in fluid communication with the chamber and located downstream of the air displacement port and upstream of the filter.

In another aspect, the overflow prevention device includes a float and a float trap seal.

In a further aspect, the float trap seal is located between the float and filter.

In an additional aspect, the float trap seal defines an aperture, the aperture being located between the air displacement port and the filter.

In yet another aspect, the float defines an exterior diameter and the aperture defines an interior diameter, the interior diameter being less than the exterior diameter.

In still a further aspect, the float trap seal is located in a fluid passageway between the air displacement port and filter. The float trap seal defines a valve seat, and the valve seat is configured to receive the float in sealing engagement therewith, the sealing engagement preventing fluid communication between the air displacement port and the filter.

In an additional aspect, a vent stack, the vent stack is coupled to the air displacement port in fluid communication therewith and the odor mitigation subassembly is provided within the vent stack.

In another aspect, the vent stack has opposed first and second ends, and the air displacement port is coupled to the vent stack at a first location positioned between the first and second ends.

In yet a further aspect, the filter is mounted to the first end of the vent stack.

In an additional aspect, the float trap seal is located between the filter and the first location.

In still another aspect, the float is located in the vent stack between the float trap seal and the second end.

In a further aspect, the first end is located in an elevated positioned relative to the second end.

In yet an additional aspect, the vent stack defines a conduit having a first diameter and the air displacement port defines a conduit having a second diameter, the first diameter being greater than the second diameter.

In another aspect, the float defines an exterior diameter that is less than the first diameter and greater than the second diameter.

In another aspect, the invention provides a cabinet incorporating an accumulator assembly.

In a further aspect, the cabinet includes a basin configured to receive liquid.

In an additional aspect, the basin is coupled to the accumulator assembly and configured to communicate liquid from the basin to the accumulator assembly.

In a further aspect, the basin is coupled to the accumulator assembly at the inlet.

Further objects, features and advantages of this invention will become readily apparent to persons skilled in the art

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" and "outward" (or "inner" and "outer") indicate a direction that is generally toward or away from a central axis of the referred to part, whether or not such an axis is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
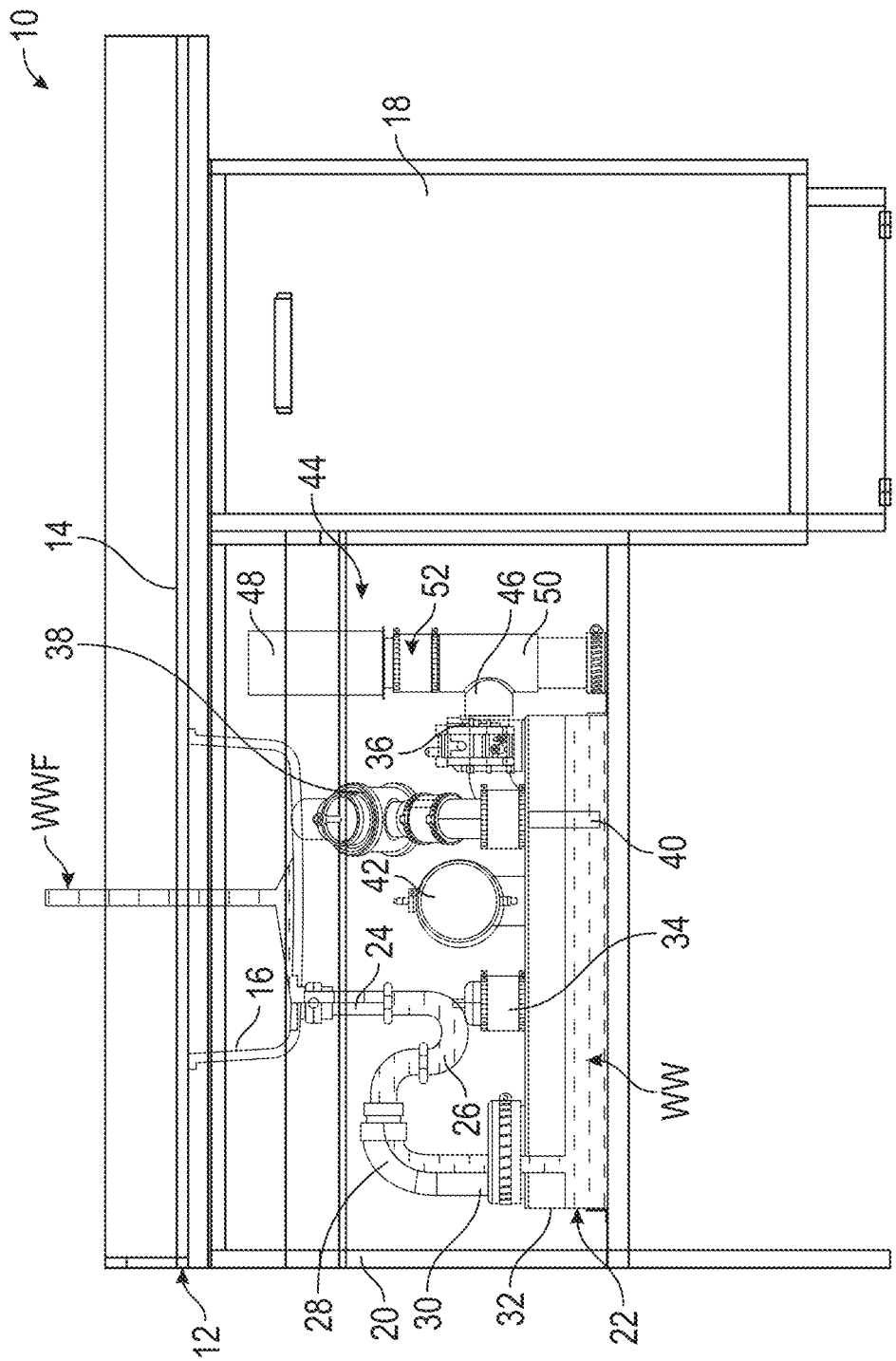
FIG. 1 is a front schematic view of a cabinet incorporating an accumulator assembly in accordance with the principles of the present invention.
Figure 2:
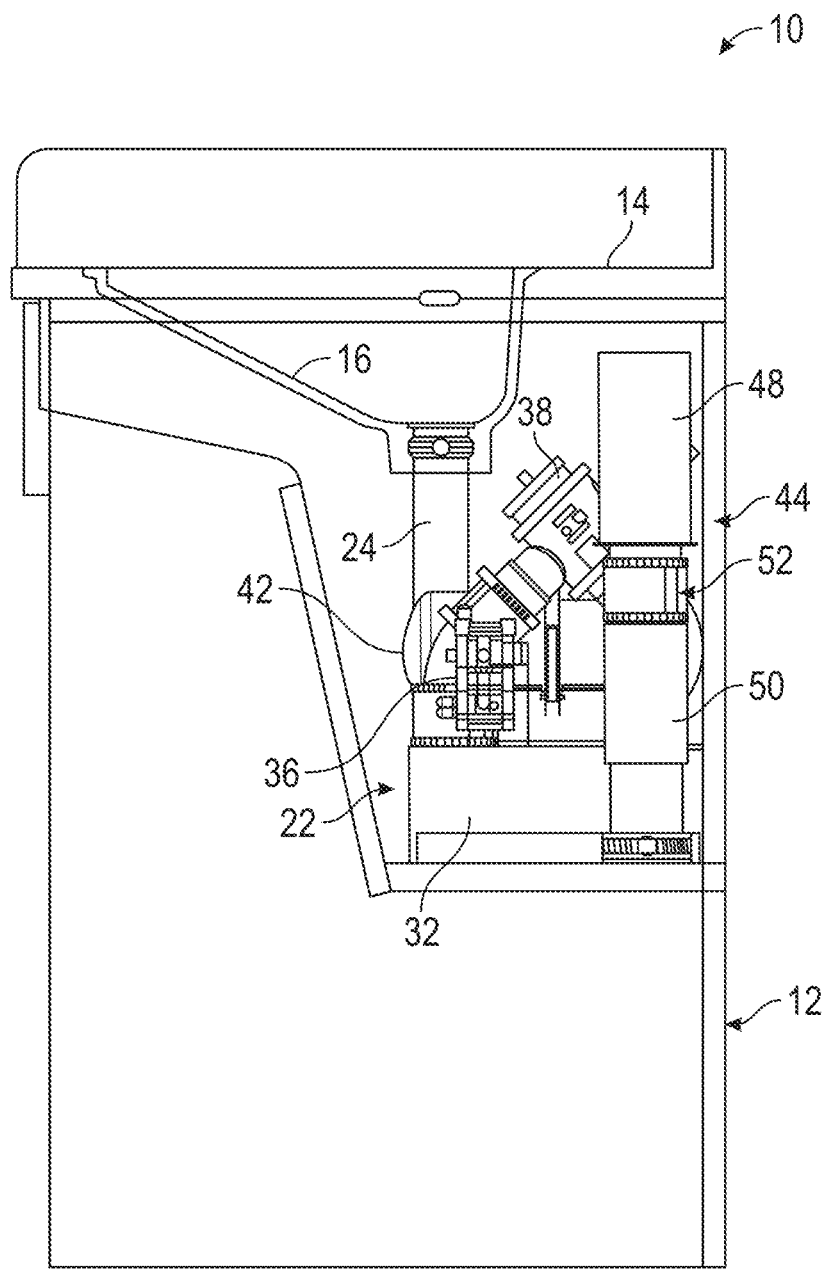
FIG. 2 is a side view of the cabinet and accumulator assembly seen in FIG. 1.
Figure 3:
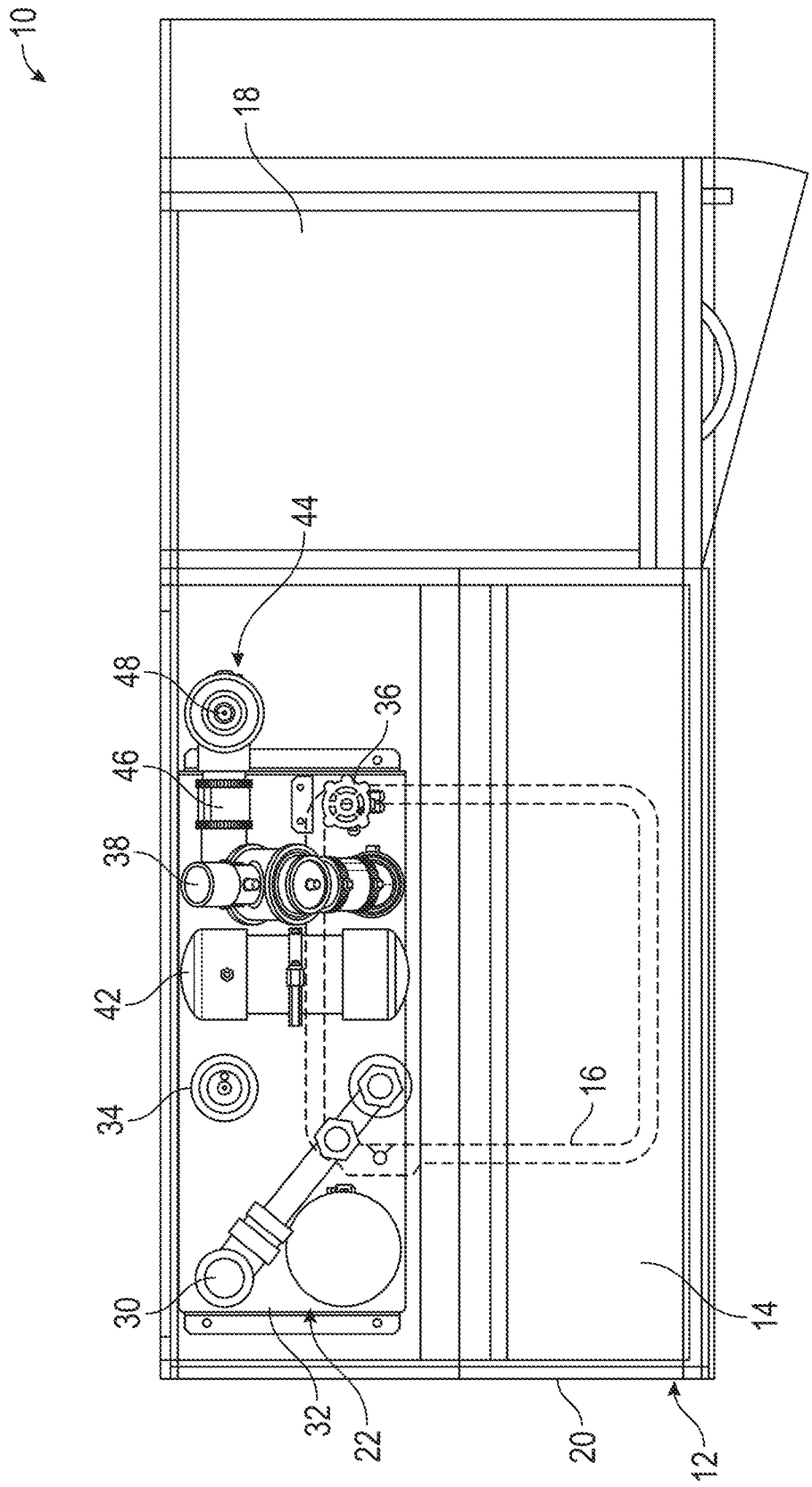
FIG. 3 is a top view of the cabinet and accumulator assembly seen in FIG. 1, with the top surface of the cabinet removed and the basin overlaid thereon.
Figure 4:
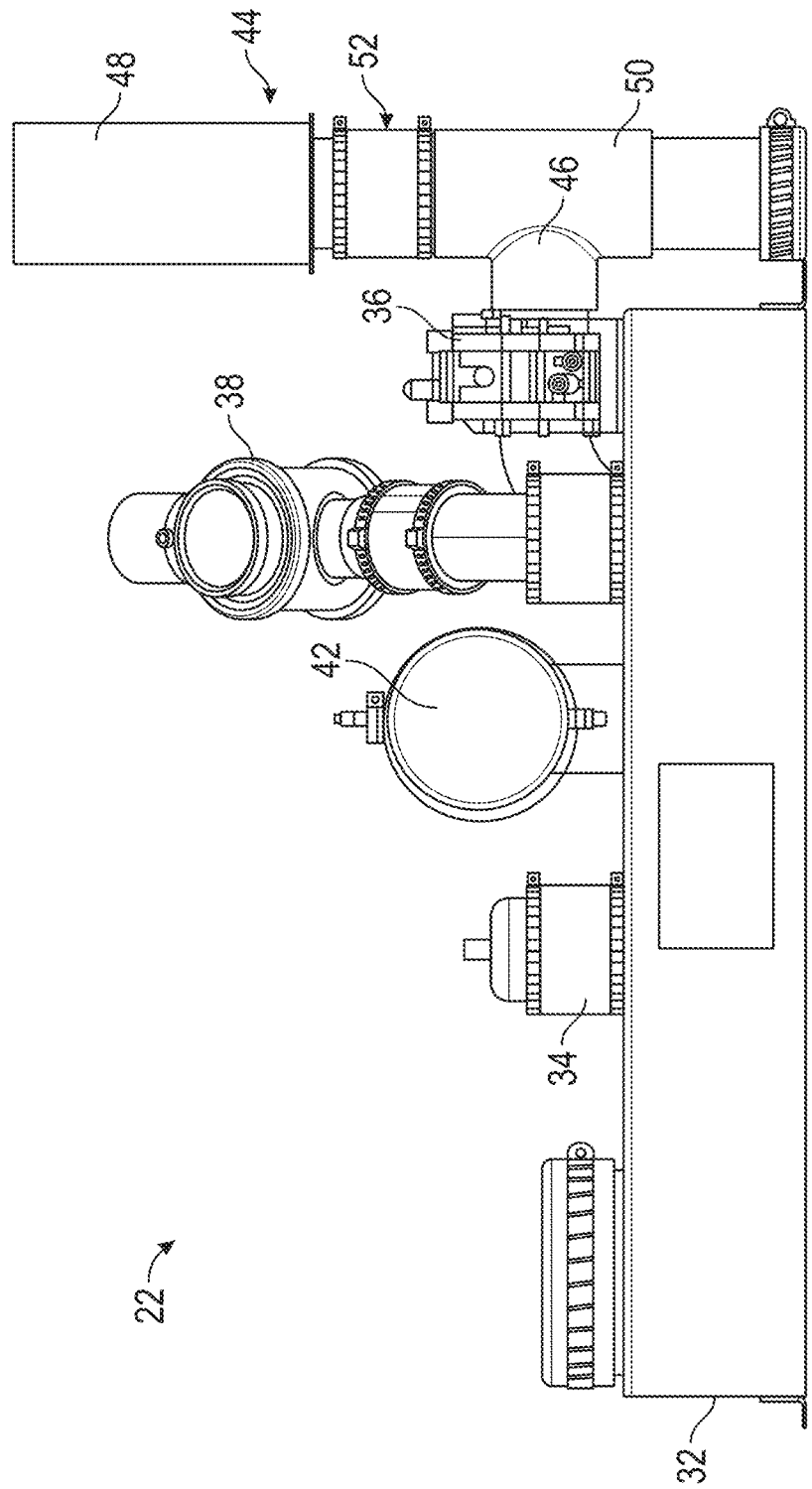
FIG. 4 is a front view of the accumulator assembly, apart from the cabinet, similar to that seen in FIG. 1.
Figure 5:
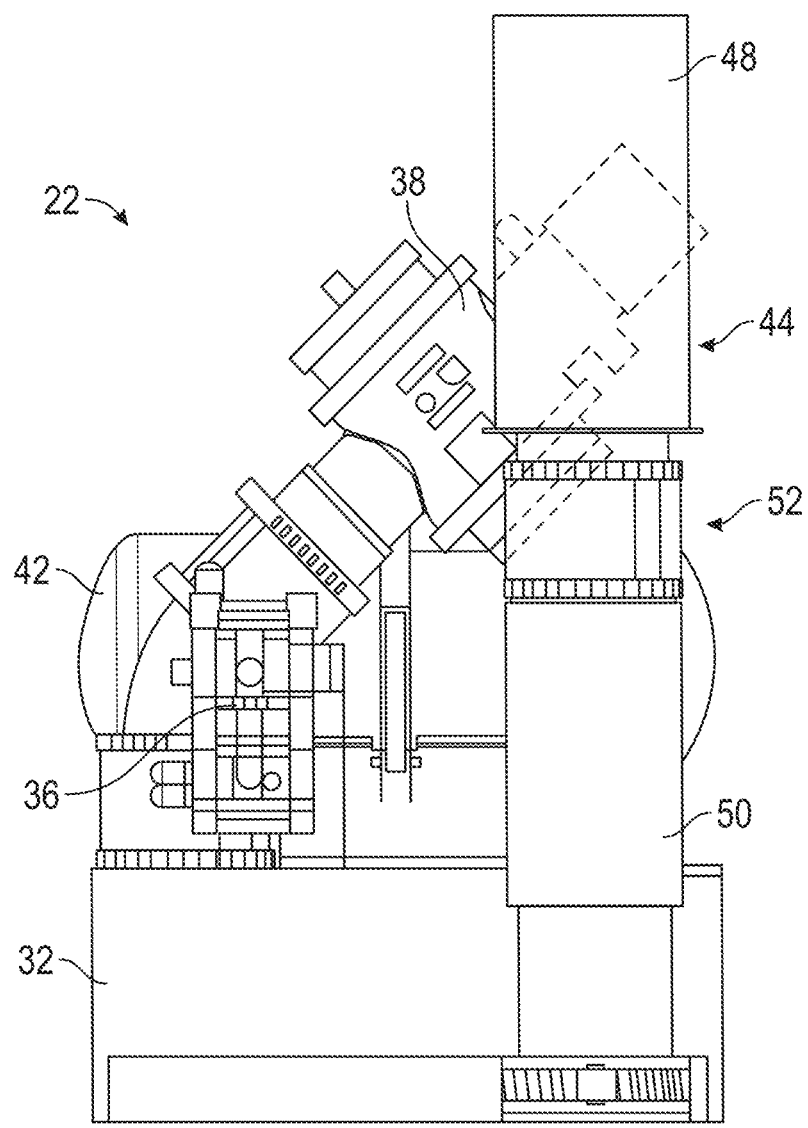
FIG. 5 is a side view of the accumulator assembly seen in FIG. 4.
Figure 6:
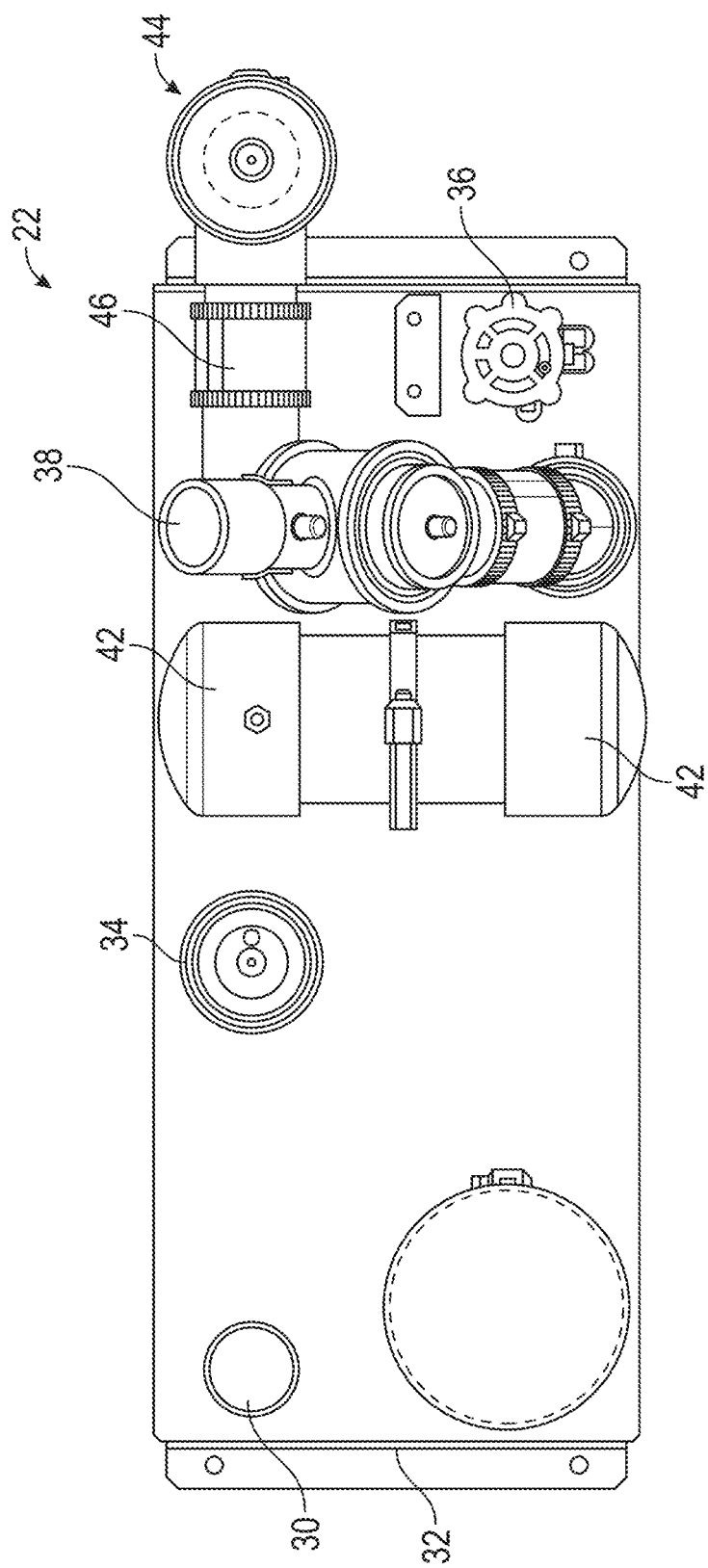
FIG. 6 is a top view of the accumulator assembly seen in FIG. 4.

Referring now to the drawings, an accumulator assembly embodying the principles of the present invention is generally illustrated in FIG. 1 and designated at 22. As illustrated in FIG. 1 and in FIGS. 2-6, the accumulator assembly 22 is incorporated into a cabinet, console, table or other support structure 12, hereinafter collectively referred to as a "cabinet." While illustrated and discussed in the context of use with a cabinet, it will be appreciated that the accumulator assembly is not limited to use within a cabinet and that a cabinet installation is but one of many conceivable applications for the accumulator assembly 22. It will further be appreciated that the accumulator assembly may be employed in any application where wastewater needs to be collected and evacuated.

The cabinet includes a top surface 14 in which is provided or mounted a basin 16 that is configured to receive water from a faucet or other source (not shown). The cabinet may also include one or more storage pedestals 18 and/or support legs 20. Preferably, the storage pedestal includes a door to conceal supplies or other material retained in the pedestal and a skirt or shroud (not shown) is used to conceal the associated plumbing and the accumulator assembly 22, which are positioned within the cabinet, generally beneath the basin.

The basin is connected to the accumulator assembly by a tailpipe 24 and P-trap 26, which are conventional. A waste pipe 28 is connected to the P-trap on one end, and on the other end is connected to a waste inlet tube/port 30 of the accumulator assembly 22. As depicted in FIG. 1 by the arrow, wastewater flow (WWF) flows into the basin and then travels through the tailpipe 24, P-trap 26, waste pipe 28 and inlet port 30, after which it is discharged into a waste retention chamber 32 of accumulator assembly 22.

Once wastewater has filled the waste retention chamber to a predetermined level, a sensor 34, mounted to the waste retention chamber 32, detects the level of wastewater (WW) and provides a corresponding signal to a controller 36. The controller 36 initiates the drain cycle by opening an extraction valve 38.

In one preferred embodiment, the sensor 34 is a fluid level sensor 34 that extends into the waste retention chamber 32, as seen in FIGS. 7-11. As the level of wastewater (WW) rises in the waste retention chamber 32, a volume of air 33 is trapped in the sensor 34. Further rising of the wastewater (WW) in the retention sensor 34 increases the pressure on the volume of trapped air 33.

The sensor 34 is connected to the controller 36, which is preferably, but not limited to, a pneumatic controller 36, such the pneumatic controller 36 disclosed in U.S. Pat. No. 10,288,189, which is herein incorporated by reference. Upon a sufficient pressure developing within the sensor 34 as a result of the trapped volume of air 33, which is based on the desired level of wastewater (WW) in the waste retention chamber 32, the pressure causes the controller 36 to activate, which in turn activates the extraction valve 38.

The extraction valve 38 forms a connection between an extraction pipe 40 of the accumulator assembly 22 and the evacuation line extending from the wall. When the extraction valve 38 is opened, vacuum pressure in the evacuation line draws wastewater (WW) from the waste retention chamber 32 through the extraction pipe 40, which extends adjacent to the bottom of the waste retention chamber 32, below the upper level of wastewater (WW). The accumulator assembly 22 also includes a vacuum source spooler 42, coupled to the extraction valve 38 and controller 36, to ensure that there is sufficient vacuum pressure to open the extraction valve 38, which may be a pneumatic diaphragm-type of vacuum actuated valve 38.

Once the volume of wastewater (WW) within the waste retention chamber 32 is lowered to a predetermined level as sensed by the sensor 34, and/or after a predetermined length of time, the extraction valve 38 is closed until the waste retention chamber 32 again needs emptying.

To control the odor produced by within the accumulator assembly 22 without requiring a vent pipe in the adjacent wall, the accumulator assembly 22 is provided with an odor mitigation subassembly 44. The odor mitigation subassembly 44 includes an air displacement port 46 to which is coupled an odor filter 48, preferably a canister-type, charcoal or charcoal-HEPA filter. The air displacement port 46 is mounted on the top wall of the waste retention chamber 32 and is in open communication with the interior of the waste retention chamber 32. As wastewater (WW) flows into the waste retention chamber 32, air 49 in the waste retention chamber 32 is displaced through the air displacement port 46 and into a vent stack 50 attached to the displacement port 46. The bottom of the vent stack 50 is closed off and located beneath the connection of the vent stack 50 with the displacement port 46, The top of the vent stack 50 is located above this connection point and incorporates the filter 48.

Figure 7:
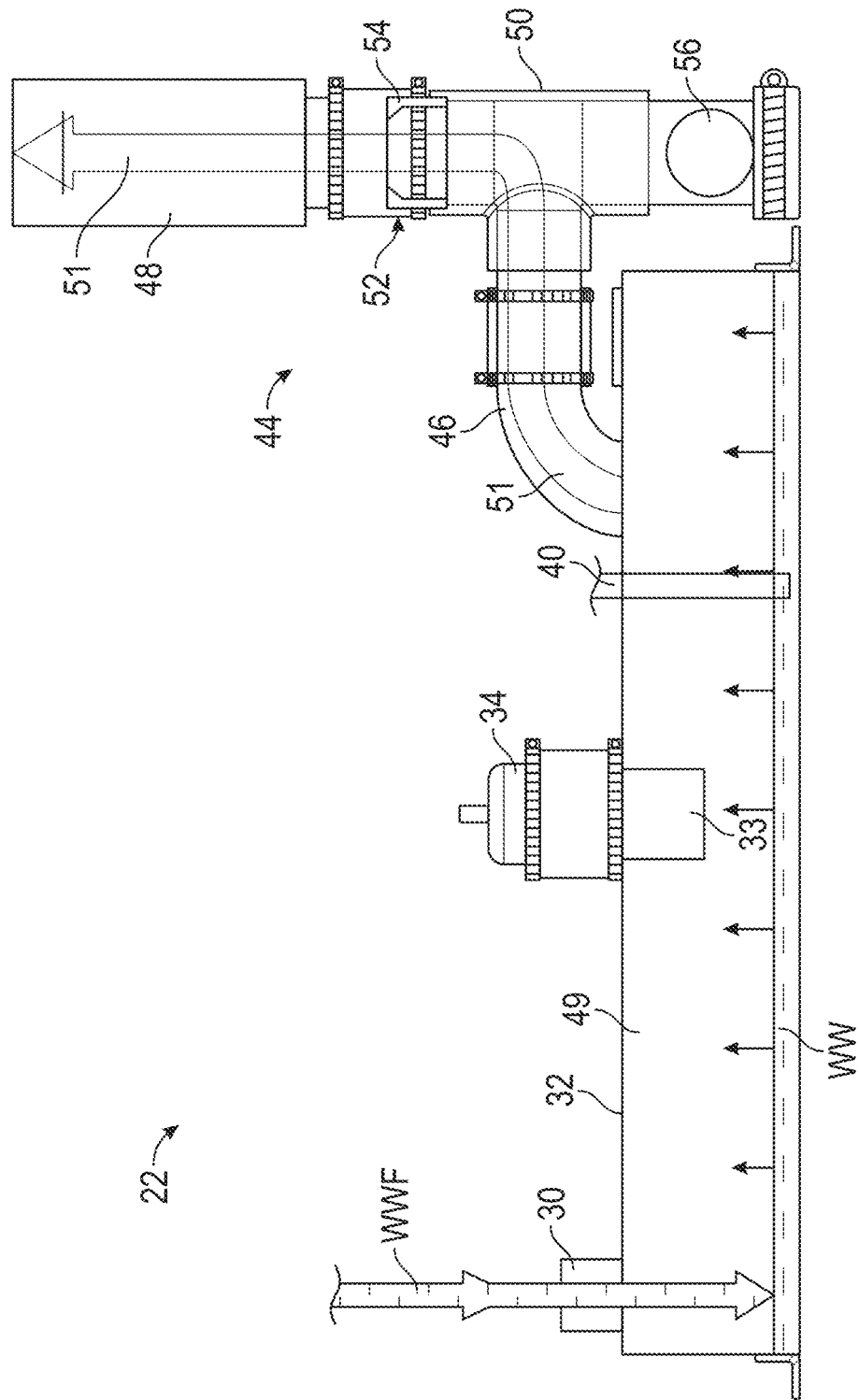
FIG. 7 is a schematic depiction of portions of the accumulator assembly during filling of the waste retention chamber.
Figure 8:
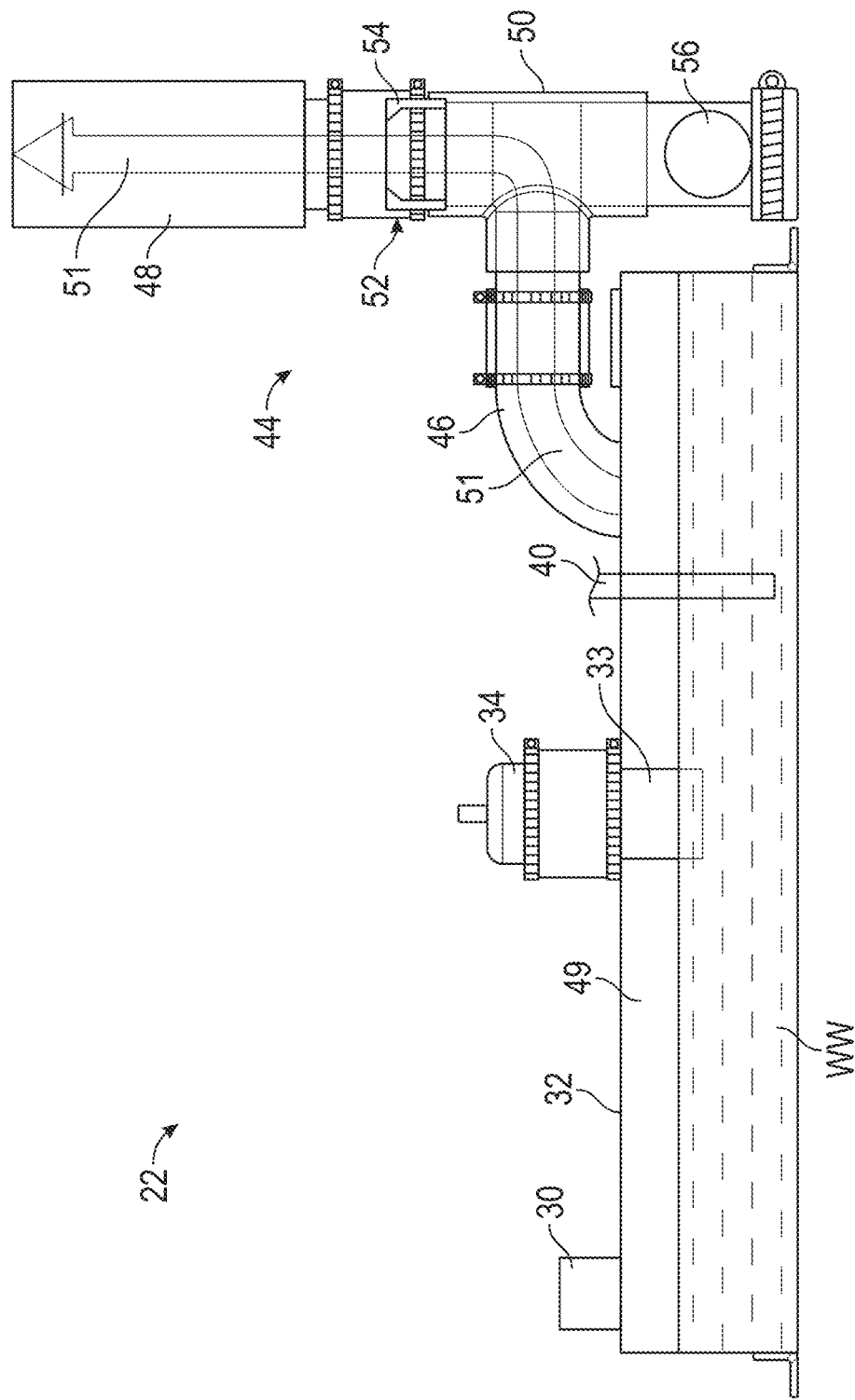
FIG. 8 is a schematic depiction of portions of the accumulator assembly, showing a full waste retention chamber and initiation of the drain cycle.

As air 49 is purged from the waste retention chamber 32 by the increasing liquid level in the waste retention chamber 32, it flows through the air displacement port 46, into the vent stack 50 and out through the filter 48 into the open air space of the cabinet 12, generally beneath the cabinet's top surface 14. This is generally depicted in FIGS. 7 and 8. As the purged air 51 passes through the filter 48, the odors associated therewith are removed and substantially odor-free air is released since all of the purged air 51 must pass through the filter 48.

Figure 9:
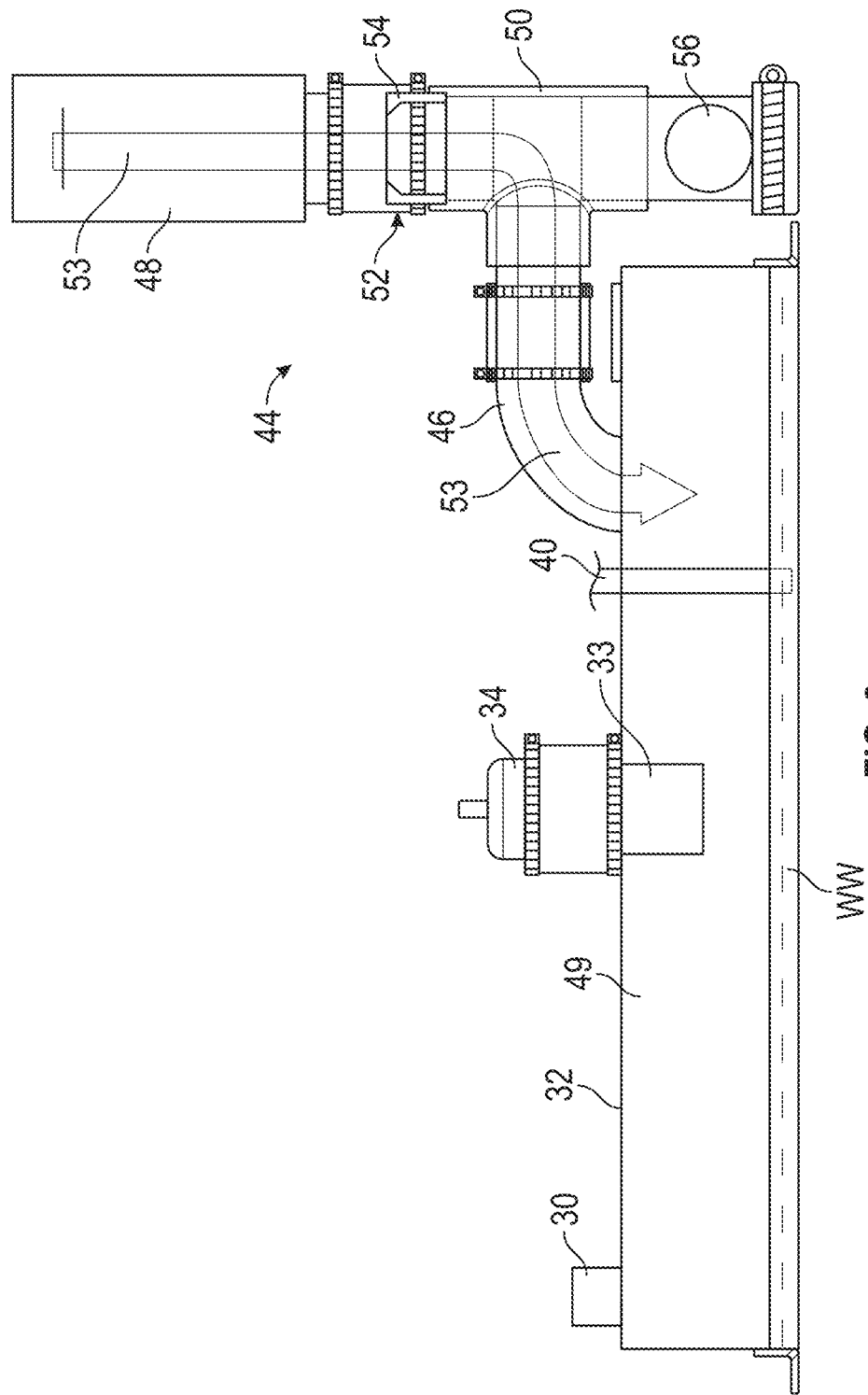
FIG. 9 is a schematic depiction of portions of the accumulator assembly during the drain cycle.

When the sensor 34 is triggered and the wastewater (WW) is being evacuated, fresh air 53 is drawn into the waste retention chamber 32 in reverse, through the filter 48, vent stack 50 and air displacement port 46, into the waste retention chamber 32, as depicted in FIG. 9.

Figure 10:
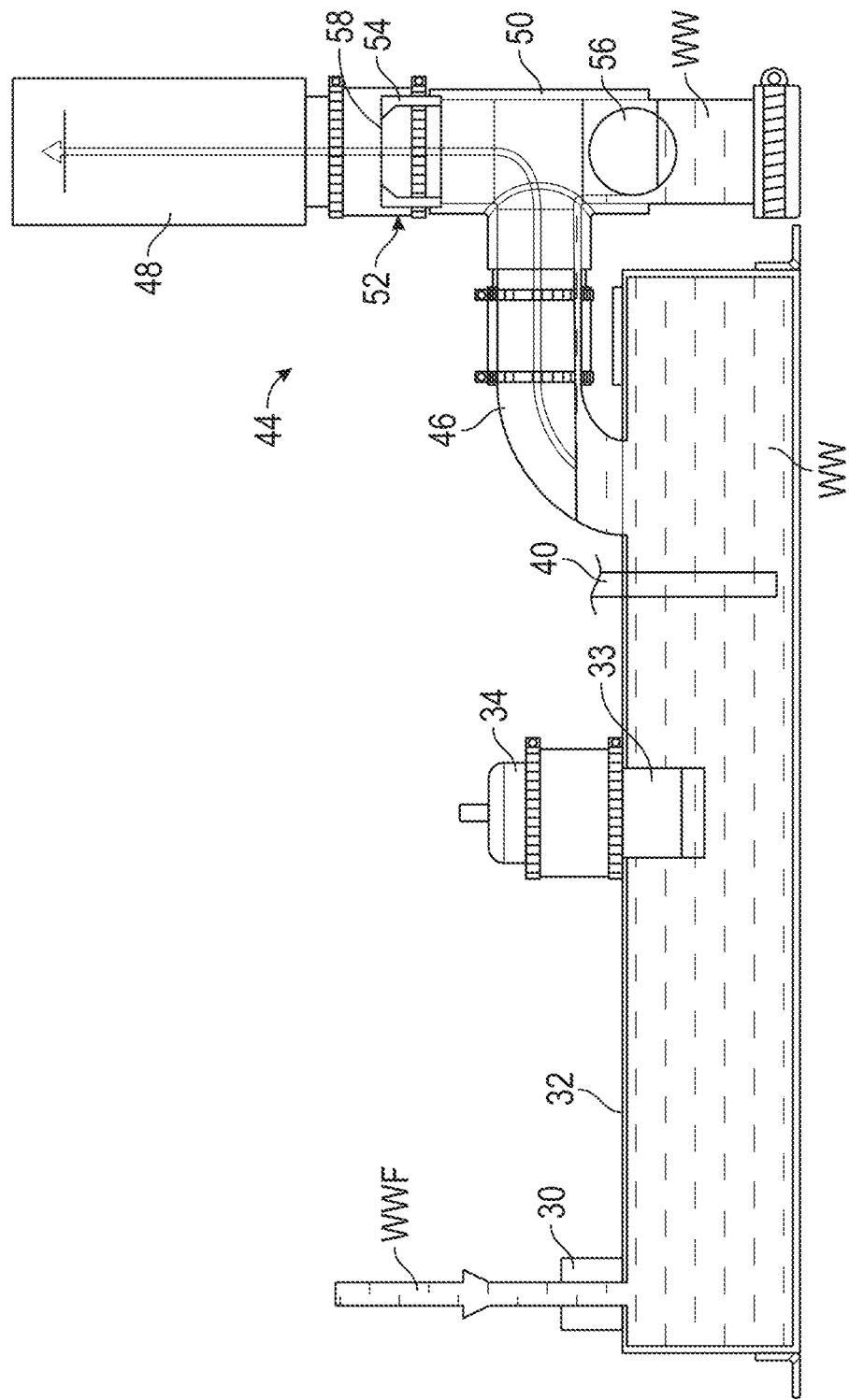
FIG. 10 is a schematic depiction of portions of the accumulator assembly, showing a fault condition where the waste retention chamber is full and is not being evacuated.
Figure 11:
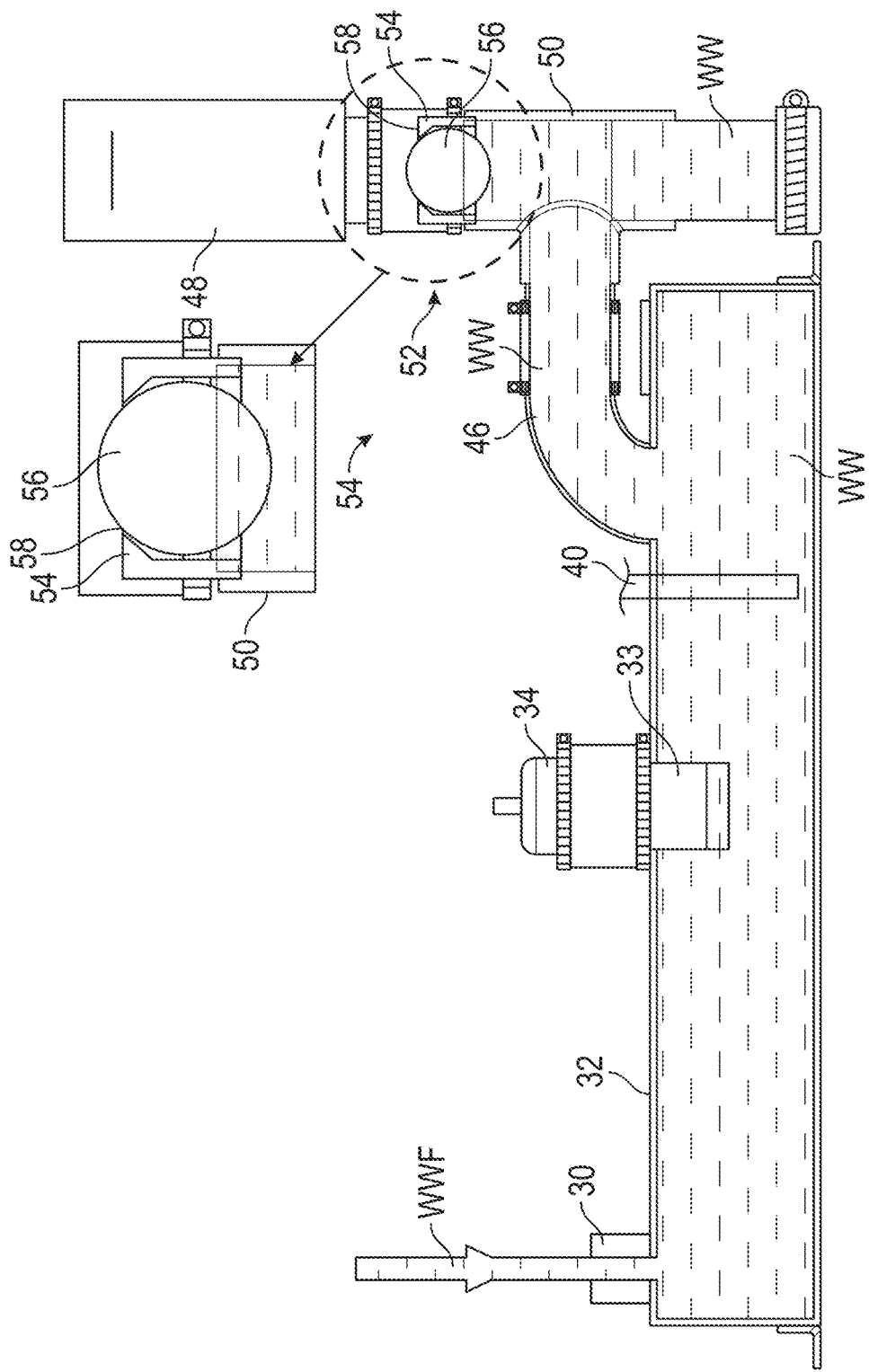
FIG. 11 is a schematic depiction of portions of the accumulator assembly, showing a fault condition where the waste retention chamber is full and is not being evacuated, and overflowing wastewater has been stopped from flowing through the filter and into the examination room.

However, since the accumulator assembly 22 is an open system via the filter 48 and since the filter 48 is located beneath the basin 16, should one of the liquid level sensor 34, the pneumatic controller 36 or the extraction valve 38 fail, wastewater (WW) may accumulate and eventually enter into the air displacement port 46 and vent stack 50, as seen in FIG. 10, without detection by the practitioner using the basin 16. To prevent wastewater (WW) continuing to flow into the vent stack 50 and passing through the filter 48, and then onto the floor of the examination room, the odor mitigation subassembly 44 includes an overflow prevention device 52. The construction and operation of the overflow prevention device 52 is shown in FIGS. 10 and 11.

The overflow prevention device 52 includes a float trap/seal 54 provided in the vent stack 50 immediately below the filter 48, but above the connection between the vent stack 50 and the air displacement port 46. The float trap/seal 54 may be press fit into the vent stack 50 or provided as a separate device, fitted between portions of the vent stack 50 and/or the filter 48. The overflow prevention device 52 also includes a float 56 (seen in FIGS. 7-11) provided in the vent stack 50 beneath the float trap/seal 54. Preferably, the float 56 is a round, ball-type float 56, highly buoyant in the wastewater (WW), and has a diameter less than the inner diameter of vent stack 50 and air displacement port 46.

The float trap/seal 54 has a center aperture 58 that allows for the free passage of displaced/purged air 51 to the filter 48 during normal operation of the accumulator assembly 22. However, the diameter of the aperture 58 is less than the diameter of the float 56 and the float trap/seal 54 is shaped to receive and engage the float 56 should the wastewater (WW) level rise sufficiently in the vent stack 50. As depicted in FIG. 11, as the wastewater (WW) continues to rise during a fault condition, the float 56 engages the float trap/seal 54 and forms a liquid tight seal therewith. The wastewater (WW) is thereafter prevented from flowing further up the vent stack 50, through the filter 48 and, subsequently, into the surrounding area.

Since the float/trap seal 54 is positioned beneath the basin 16, any continued flow (WWF) of wastewater (WW) will eventually backup into the basin 16. With the backing up of wastewater (WW) into the basin 16, a practitioner using of the system will be alerted to the fault condition and can stop the flow (WWF) of additional wastewater (WW) into the basin 16. A service call can then be made to repair the condition causing the fault. Preferably, the vent stack 50 is made of a transparent or translucent material so that an operator or repair technician can confirm that the overflow measure has been triggered and that the fault condition is one related to evacuation of wastewater (WW) from the waste retention chamber 32 and not an obstruction of the plumbing leading from the basin 16 to the waste retention chamber 32 of the accumulator assembly 22.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. An accumulator assembly comprising:
a wastewater retention tank defining an interior chamber, the wastewater retention tank having portions defining an inlet into the chamber;
a fluid level sensor coupled to the waste retention tank and configured to sense a level of liquid in the chamber;
an extraction pipe extending into the chamber;
an extraction valve coupled to the extraction pipe;
a controller coupled to the fluid level sensor and to the extraction valve, the controller configured to open the extraction valve upon receipt of a signal from the sensor; and
an odor mitigation subassembly in fluid communication with the chamber, the odor mitigation subassembly including an air displacement port, an odor filter and an overflow prevention device, the air displacement port being in fluid communication with the chamber and the odor filter being coupled to the air displacement port and in fluid communication with the chamber, the overflow prevention device being in fluid communication with the chamber and located downstream of the air displacement port and upstream of the filter.

2. The accumulator assembly according to claim 1, wherein the overflow prevention device includes a float and a float trap seal.

3. The accumulator assembly according to claim 2, wherein the float trap seal is located between the float and filter.

4. The accumulator assembly according to claim 2, wherein the float trap seal defines an aperture, the aperture being located between the air displacement port and the filter.

5. The accumulator assembly according to claim 4, wherein the float defines an exterior diameter and the aperture defines an interior diameter, the interior diameter being less than the exterior diameter.

6. The accumulator assembly according to claim 2, wherein the float trap seal is located in a fluid passageway between the air displacement port and filter, the float trap seal defining a valve seat, the valve seat being configured to receive the float in sealing engagement therewith, the sealing engagement preventing fluid communication between the air displacement port and the filter.

7. The accumulator assembly according to claim 2, further comprising a vent stack, the vent stack being coupled to the air displacement port in fluid communication therewith and the odor mitigation subassembly being provided within the vent stack.

8. The accumulator assembly according to claim 7, wherein the vent stack has opposed first and second ends, the air displacement port being coupled to the vent stack at a first location positioned between the first and second ends.

9. The accumulator assembly according to claim 8, wherein the filter is mounted to the first end of the vent stack.

10. The accumulator assembly according to claim 9, wherein the float trap seal is located between the filter and the first location.

11. The accumulator assembly according to claim 9, wherein the float is located in the vent stack between the float trap seal and the second end.

12. The accumulator assembly according to claim 8, wherein the first end is located in an elevated positioned relative to the second end.

13. The accumulator assembly according to claim 7, wherein the vent stack defines a conduit defining a first diameter and the air displacement port defines a conduit having a second diameter, the first diameter being greater than the second diameter.

14. The accumulator assembly according to claim 13, wherein the float defines an exterior diameter that is less than the first diameter and greater than the second diameter.

15. A cabinet incorporating the accumulator assembly of claim 1.

16. The cabinet according to claim 15, wherein the cabinet includes a basin configured to receive liquid.

17. The cabinet according to claim 16, wherein the basin is coupled to the accumulator assembly and configured to communicate liquid from the basin to the accumulator assembly.

18. The cabinet according to claim 16, wherein the basin is coupled to the accumulator assembly at the inlet.

* * * * *